No. 890,324. PATENTED JUNE 9, 1908.
M. R. ALLEN.
CATTLE GUARD.
APPLICATION FILED SEPT. 4, 1906.
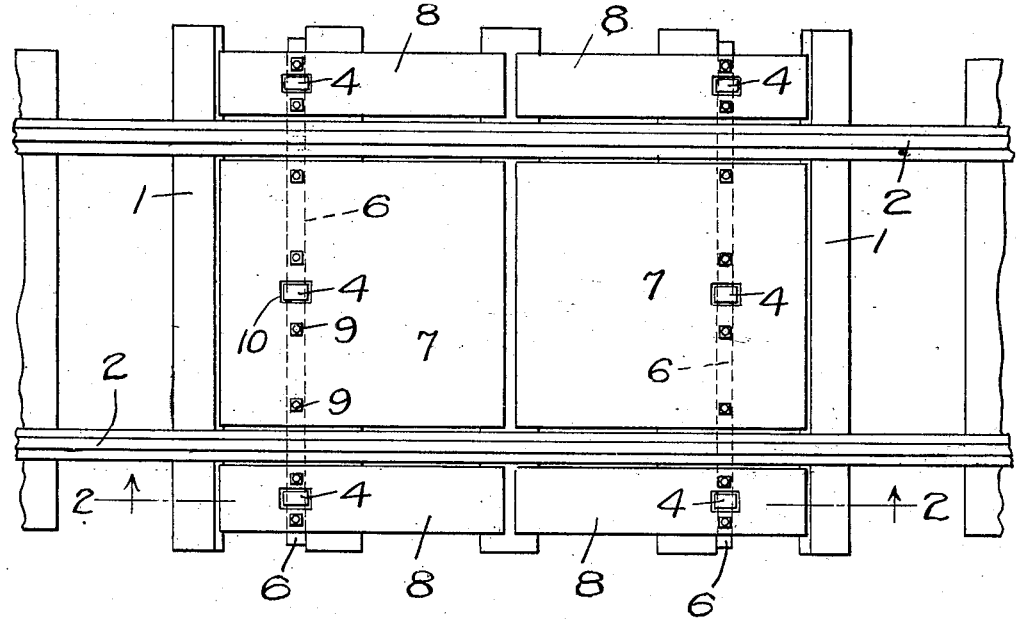
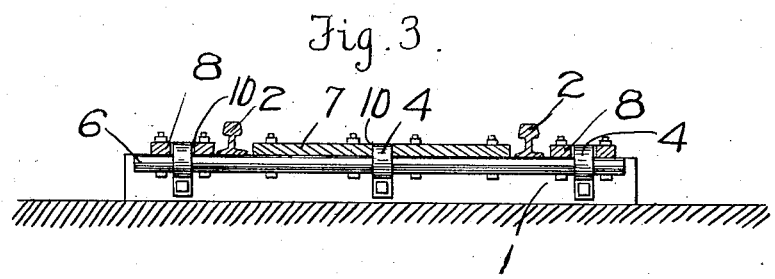
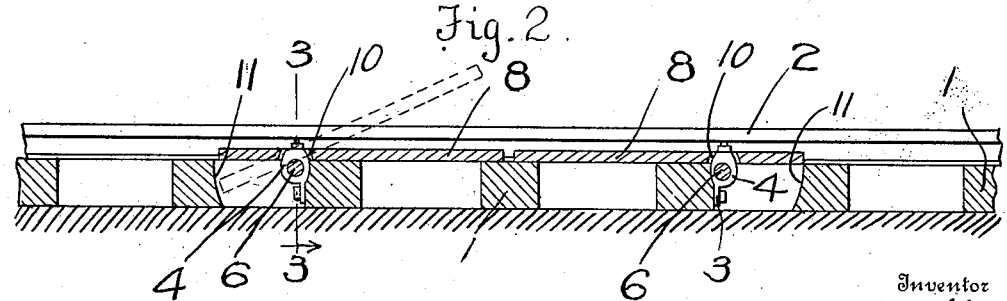
Inventor
Myrick R. Allen.
Witnesses

UNITED STATES PATENT OFFICE.

MYRICK R. ALLEN, OF LEWISBURG, TENNESSEE.

CATTLE-GUARD.

No. 890,324.　　　　　Specification of Letters Patent.　　　　Patented June 9, 1908.

Application filed September 4, 1906. Serial No. 333,262.

*To all whom it may concern:*

Be it known that I, MYRICK R. ALLEN, a citizen of the United States, residing at Lewisburg, in the county of Marshall, State of Tennessee, have invented certain new and useful Improvements in Cattle-Guards; and I do hereby declare the following to be a full, clear, and exact description of the invention, such as will enable others skilled in the art to which it appertains to make and use the same.

This invention relates to new and useful improvements in cattle guards for railroads and more particularly to that type in which rocking guard plates are provided at each side of the crossing gap, the action being such that when an animal attempts to cross this gap, the guard plates at one side thereof will be swung upwardly to bar further progress of the animal.

In connection with a cattle guard constructed generally as above described, the invention has for its object to provide a novel construction, combination, and arrangement of parts, the details of which will appear in the course of the following description, in which reference is had to the accompanying drawings forming a part of this specification, like characters of reference designating similar parts throughout the several views, wherein:

Figure 1 is a top plan view of a cattle guard constructed in accordance with the present invention. Fig. 2 is a longitudinal section on the line 2—2 of Fig. 1, looking in the direction of the arrow. Fig. 3 is a transverse section on the line 3—3 of Fig. 2, looking in the direction of the arrow.

Referring specifically to the accompanying drawings the numeral 1 designates the ties and the numeral 2 track rails supported thereon. Adjacent the crossing, brackets 3 are secured to the ties 1 and are formed at their upper ends with enlarged collars 4, the bores of which are in alinement. Parallel transverse rock shafts 6 are journaled in the collars 4 beneath the rails 1. The guard plates above referred to are designated by the numerals 7 and 8, the plates 7 being of greater area than the plates 8 and being disposed between the rails, while the plates 8 are arranged at each side of the rails. The plates 7 and 8 are secured to the respective shafts 6 by means of bolt and nut fastenings 9. Said plates are constructed with slotted openings 10 through which the collars 4 are projected, and the ties 1 adjacent the rear ends of the plates 7 and 8 are formed with curved sides 11, along the line of the arc-like movement of said rear ends when they are depressed.

In use, should an animal attempt to cross the gap normally closed by the plates 7 and 8, which lie in horizontal position upon the ties 1, the rear ends of any one of said plates at one side of the crossing will be depressed and in such action will rock the shaft 6 by which said plate is carried, thereby elevating the portions of all the plates forwardly of the said shaft 6 so as to bar the further progress of the animal.

A cattle guard constructed in accordance with the present invention is simple, inexpensive to manufacture, and practical and efficient in use.

What is claimed is;

In a cattle guard, the combination with the ties and the track rails, of series of brackets secured to relatively extreme side faces of two of said ties, collars carried by each bracket and in alinement as a series, said collars lying in contact with the adjacent side faces of the ties and projecting slightly above the same, transverse rock shafts journaled in the collars of each respective series and guard plates secured to the upper sides of each of said rock shafts, said guard plates being arranged in series of three, disposed between and at each side of the rails and being each formed with slotted openings surrounding the projecting upper portions of said collars, said guard plates having major projecting portions adapted in normal position to rest upon the upper faces of said ties and having minor projecting portions at one side of said shafts, unsupported, said major projecting portions extending towards one another.

In testimony whereof, I affix my signature, in presence of two witnesses.

MYRICK R. ALLEN.

Witnesses:
P. C. SMITHSON,
HENRY K. MOSS.